United States Patent [19]

Taub et al.

[11] Patent Number: 4,995,919
[45] Date of Patent: Feb. 26, 1991

[54] METHOD AND APPARATUS FOR PARTING A DECK OF AMORPHOUS ALLOY RIBBONS

[75] Inventors: Alan I. Taub, Schenectady, N.Y.; Peter G. Frischmann, Scottsdale, Ariz.; Minyoung Lee, Schenectady, N.Y.

[73] Assignee: General Electric Company, Schenectady, N.Y.

[21] Appl. No.: 339,039

[22] Filed: Apr. 17, 1989

[51] Int. Cl.5 .............................................. B23K 7/00
[52] U.S. Cl. .................................. 148/9 R; 148/120
[58] Field of Search ............................ 148/9 R, 120; 219/121.18, 68, 69.1

[56] References Cited

U.S. PATENT DOCUMENTS

| | | | |
|---|---|---|---|
| 499,519 | 6/1893 | Coffin | 29/606 |
| 1,233,690 | 7/1917 | Murray, Jr. | 148/9 R |
| 2,358,772 | 11/1943 | Brow et al. | 148/9 R |
| 3,483,778 | 7/1967 | Forthmann, Jr. | 82/DIG. 1 |
| 3,818,587 | 6/1974 | Williams | 29/606 |
| 4,300,417 | 11/1981 | Veldkamp | 82/DIG. 1 |
| 4,328,411 | 5/1982 | Haller et al. | 219/121.18 |
| 4,356,377 | 10/1982 | Norton et al. | 219/121.18 |
| 4,549,679 | 10/1985 | Watson | 225/2 |
| 4,584,036 | 4/1986 | Taub et al. | 148/120 |
| 4,670,636 | 6/1987 | Taub et al. | 219/121.18 |
| 4,715,906 | 12/1987 | Taub et al. | 148/120 |

FOREIGN PATENT DOCUMENTS

| | | |
|---|---|---|
| 2460086 | 6/1979 | France . |
| 0057170 | 5/1978 | Japan . |
| 1407232 | 4/1973 | United Kingdom . |

Primary Examiner—S. Kastler
Attorney, Agent, or Firm—James E. McGinness; James C. Davis, Jr.; James Magee, Jr.

[57] ABSTRACT

A method and apparatus for parting a deck of amorphous alloy ribbons in one operation is disclosed. Force is applied to a deck of ribbons to place it under tension. A localized zone in the deck is compressed and rapidly heated to the softening temperature of the amorphous alloy. The deck separates along a seam within the zone due to the tensile force and localized rapid heating. A high quality edge is produced where the separated ribbon edges are free of burrs, meltbeads or substantial cracking and chipping.

15 Claims, 9 Drawing Sheets

WHERE T = THE TEMPERATURE IN °K OF THE SPECIMEN BEING RAMPED, &
Tx = THE TEMPERATURE IN °K OF THE ONSET OF CRYSTALLIZATION
AT 20°C PER/MINUTE
dT = THE CHANGE IN TEMPERATURE IN °C
dt = THE CHANGE IN TIME IN MINUTES

WHERE T = THE TEMPERATURE IN °K OF THE SPECIMEN BEING RAMPED, &
$T_x$ = THE TEMPERATURE IN °K OF THE ONSET OF CRYSTALLIZATION AT 20°C PER/MINUTE
dT = THE CHANGE IN TEMPERATURE IN °C
dt = THE CHANGE IN TIME IN MINUTES

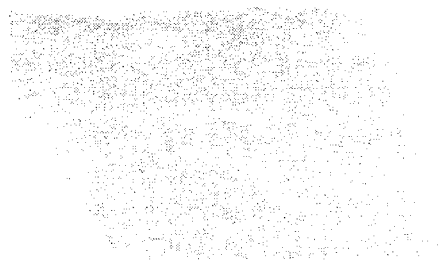
Fig. 9
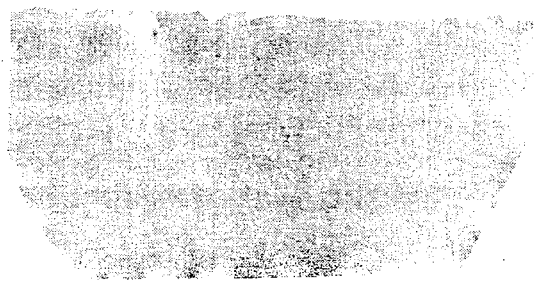
Fig. 10

METHOD AND APPARATUS FOR PARTING A DECK OF AMORPHOUS ALLOY RIBBONS

CROSS REFERENCES TO RELATED APPLICATIONS:

The subject application relates to copending application Ser. No. 07/250,805, filed Sept. 29, 1988.

The present invention relates in general to a new and improved method for severing amorphous alloys, and in particular to a method for separating a deck of amorphous alloy ribbons in a localized heated region.

BACKGROUND OF THE INVENTION

Amorphous alloys exhibit a number of differences in their properties from the normal crystalline form of the same alloys which make them especially suitable for certain applications. Amorphous alloys are harder, more abrasive and more sensitive to mechanical stresses and have higher mechanical strength, flexibility and electrical resistivity than the crystalline forms of the same alloys. Some amorphous alloys exhibit the softest magnetic characteristics of any known materials. This latter property is especially desirable for magnetic core materials since the ease with which the material can be magnetized and demagnetized controls the hysteresis losses experienced. This becomes important where the magnetic material is repetitively magnetized in opposite directions as is, for example, the case in magnetic cores of the type used in AC machinery.

Because of the way amorphous alloys are formed, only thin ribbons can be produced and such ribbons have a maximum thickness of about 0.076 mm. Typical thicknesses are from about 0.015 mm to about 0.05 mm. By contrast, transformer core laminations are normally about ten times thicker. Thus, about ten times as many layers of amorphous metal ribbons are required to form a transformer core structure of a given cross section as are required to form the same structures using prior art transformer materials.

An important consideration in many applications where magnetic cores are used is the space factor. The space factor may be defined as the ratio of the volume of core material within the built up core to the volume of the built up core itself. The space factor is important because if the layers making up the core do not lie flat upon each other but remain separated by air or other non-magnetic material, the volume of the core will increase without a corresponding increase in its desirable magnetic properties. Ribbon irregularities decrease the space factor. Thus, if burrs or irregularities are present on the edges of the core laminations, the laminations will not lie flat and consequently the space factor is degraded. The thinness dictated by the way amorphous metals are made adds to the problem. For example, edge or surface irregularities which are small enough to be ignored in conventional core laminations, may cause severe degradation of the space factor when ten or more times as many layers are used.

The deformation of any material requires the material to flow as it is forced or worked. At low temperatures the flow of amorphous alloys is governed by an inhomogeneous deformation mechanism characterized by high stress. The high stress causes two problems: a high rate of tool wear and loss of magnetic properties. If subjected to high stress, the tools used in the forming operations of articles that consist of such alloys will have only short useful lives. It is also known that inhomogeneous deformation of amorphous alloys can be detrimental to the soft magnetic properties of the alloys. It is therefore desirable to avoid such high stress in deforming or working amorphous alloys.

As disclosed in Japanese patent application No. 32288 to T. Masumoto, published Nov. 5, 1976, some of the difficulties in forming amorphous alloys can be overcome or reduced by performing the forming operations at elevated temperatures. As set forth in that publication, forming processes should be applied to the amorphous alloy only at temperatures above the "ductile transition temperature", herein designated $T_p$. This same temperature, which is regarded as critical for working amorphous alloys, is also referred to as the "plastic transition temperature" in an article by Liebermann, in Mat. Sci. Eng. Vol. 46, Pg. 241 (1980). It is known that amorphous alloys can be deformed above this plastic transition temperature at low stresses to a high degree of straining. Such hot forming of a metallic glass at low stress is reported in D.H.R. "Proceedings Third International Conference on Rapidly Quenched Metals", by J. Patterson, A. L. Greer, J. A. Leake (Chameleon Press, 1978), pg. 293 and was demonstrated by drawing a cup from a ribbon of amorphous alloy. As reported in Scripta Met. Vol. 14, Pg. 1331 (1980), strains approaching 100% in an amorphous alloy ribbon of PdFeSi were produced at stresses as low as 150 Mpa when deformation of the ribbon was carried out at high temperatures.

In none of the foregoing studies, nor in the methods developed from the studies, was any concern given to the effect of the rate of heating on the forming of the amorphous article. Primary consideration in each prior instance was given to the crystallization kinetics of the alloy. The object in these prior efforts was to effect the working of the alloy without imparting significant degrees of crystallinity to the article being formed and to retain the amorphous character of the alloy. The avoidance of crystallization was recognized in these prior efforts as a primary consideration in preserving the properties of the amorphous alloys.

U.S. Pat. No. 4,584,036, assigned to the present assignee, discloses a relationship between the softening and increase in workability of an amorphous alloy article and the rate at which the article is undergoing heating. As set forth in that patent, the heating history of the article, that is the heating or rate of heating to a certain temperature prior to working, must be distinguished from the effective rate at which an article is being heated at the time the working or forming of the article is taking place. This patent further discloses that amorphous alloys undergo a softening during the time when they are being heated at a relatively high heating rate. Further, the variation of the softening temperature with, or as a function of, the heating rate was determined in a quantitative manner.

U.S. Pat. No. 4,715,906, which is likewise assigned to the assignee of the present application, discloses a slightly different heating regimen. According to this regimen for heating rates of 1000° C./min. or higher, the viscosity of the alloy is so low that the softening window is enlarged in a temporal sense. The softening window is the difference between the temperature at which the alloy softens and that at which it crystallizes. When the heating rate is high enough this window is large enough for the amorphous alloy to retain its ability to be worked in an apparent "soft" state, even though the alloy is experiencing an isothermal hold of one to several seconds. Generally, the higher the rate of heating above 1000° C./min., the longer the isothermal hold which can be tolerated by the amorphous alloy article without loss of its favorable magnetic properties. These findings and the quantitative relationships developed that define the isothermal window, are all set out in the last-mentioned patent.

U.S. Pat. No. 4,670,636, assigned to the present assignee, discloses how the softening technique can be utilized to provide a method for parting a bundle of amorphous alloy articles. This is done by applying a tensile force to the article while rapidly heating a seam of the top article to be cut. The top article separates into parts and the separated parts of the top article are then withdrawn and the next article is exposed to the applied heat. It is known that heating of an amorphous alloy strip in a narrow region causes buckling and distortion of the strip, even though the heating is not sufficient to melt or even soften the material of the narrow region. Therefore, heating under the influence of tension is helpful in minimizing this property to keep the ribbon flat.

In comparison to their properties before heating amorphous alloys become more brittle upon subsequent cooling. Therefore, heating of amorphous alloy ribbons causes undesirable embrittlement of the ribbons that can lead to cracking and chipping of the ribbons when they are stressed. Additionally, amorphous alloy ribbons separated under tension in a heated region, neck in the heated region. As a result, excessive necking in the heated region can cause an undesirable reduction in the thickness and width of the ribbon at the separated edge.

Accordingly, it is one object of this invention to provide a method which permits a deck of amorphous alloy ribbons to be separated without the use of cutting tools in one operation.

Another object is to avoid and prevent the formation of meltbeads, burrs, or any substantial cracking or chipping at an edge formed by separation, thereby improving the stackability of the severed edges of cut ribbon.

Another object is to provide a method for separating a deck of amorphous alloy ribbons without significantly detracting from the beneficial magnetic properties of the alloy.

Another object is to provide a method for separating a deck of amorphous alloy ribbons while minimizing the portion in the ribbons that is heated and necked.

BRIEF STATEMENT OF THE INVENTION

Therefore in one of its broader aspects, objects of this invention are achieved by separating a deck of amorphous alloy ribbons by the use of a tensile force and localized heating. In one embodiment of this invention the tensile force is applied to the deck in a direction generally normal to an intended line of severance in the deck sometimes referred to as the seam. The seam is within a zone that traverses the deck in its width and height dimensions. The force places the deck under tension and must be of at least a magnitude that will cause the deck to separate at the seam when it is heated to the softening temperature of the amorphous alloy.

The deck is compressed in a region encompassing the zone to reduce the interfacial electrical resistance between ribbons. A power supply and a control means for the power supply are operatively connected to supply a resistance heating current to the deck so it passes through the zone.

Rapid heating of the zone occurs during the time the force is being applied to the deck. The zone is heated to a temperature within the range of softening temperatures of the amorphous alloy. The control means is used to select a heating current of at least a duration and amplitude that will heat the zone to within the range of softening temperatures at a rate that will allow separation to occur along the seam within a time period of less than about one half of one second.

The deck of ribbons is separated along the seam within the zone at the time and during the time that the heating is in progress. A means to suppress arcing minimizes any arcing between the separating deck edges.

A sufficient force in combination with the rapid heating causes separation to occur very quickly so that the heated zone is kept extremely localized. Necking is limited to the localized heated zone since separation occurs before there is appreciable diffusion of heat. Separation occurs while the amorphous alloy is at a very low flow resistance due to the rapid heating. As a result, separation occurs through homogeneous deformation of the amorphous alloy. Separation stops current flow, therefore heating is stopped before the crystallization temperature of the amorphous alloy is reached. Because of the homogeneous deformation and avoidance of the crystallization temperature separation is achieved while maintaining the desirable magnetic properties of the amorphous alloy.

With this method an entire deck of ribbons may be severed in one operation, and the severed edges are free of burrs, meltbeads, or any substantial cracking or chipping. As a result the severed ribbons are suitable for assembly into magnetic cores. The space factor in the magnetic cores is optimized due to the excellent stackability of the ribbons severed in accordance with the present invention.

Objects of the invention are further made apparent by the following detailed description when read together with the accompanying drawings in which applicable reference numerals have been carried forward.

BRIEF DESCRIPTION OF THE DRAWINGS

The explanation which follows will be made clear by reference to the accompanying drawings in which:

FIG. 9 is a photograph of a successfully parted edge free of any substantial cracking or chipping.

FIG. 10 is a photograph of a parted edge illustrating the cracking and chipping resulting from excessive necking.

DETAILED DESCRIPTION OF THE INVENTION

Figure 1:
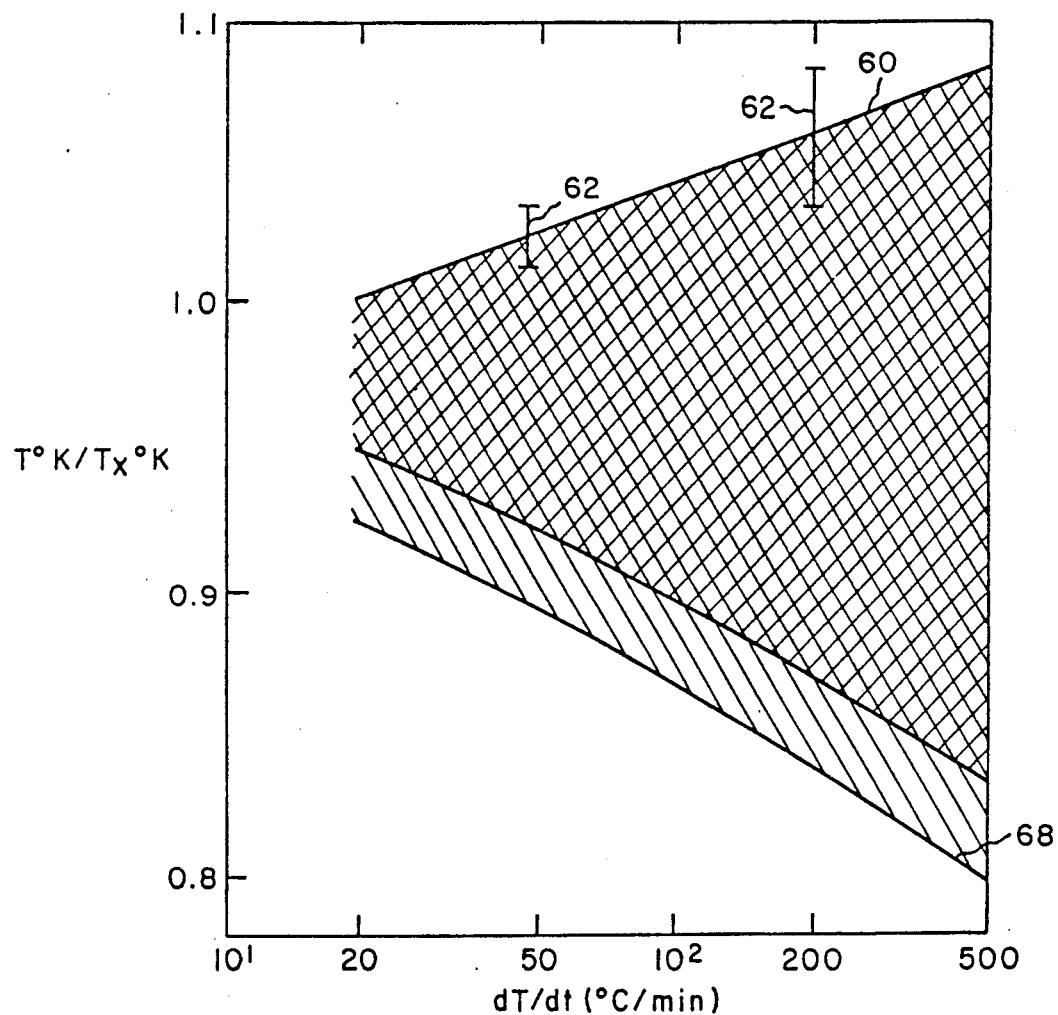
FIG. 1 illustrates in graph form the relationship between heating rates and amorphous alloy softening temperatures in accordance with the present invention.
Figure 2:
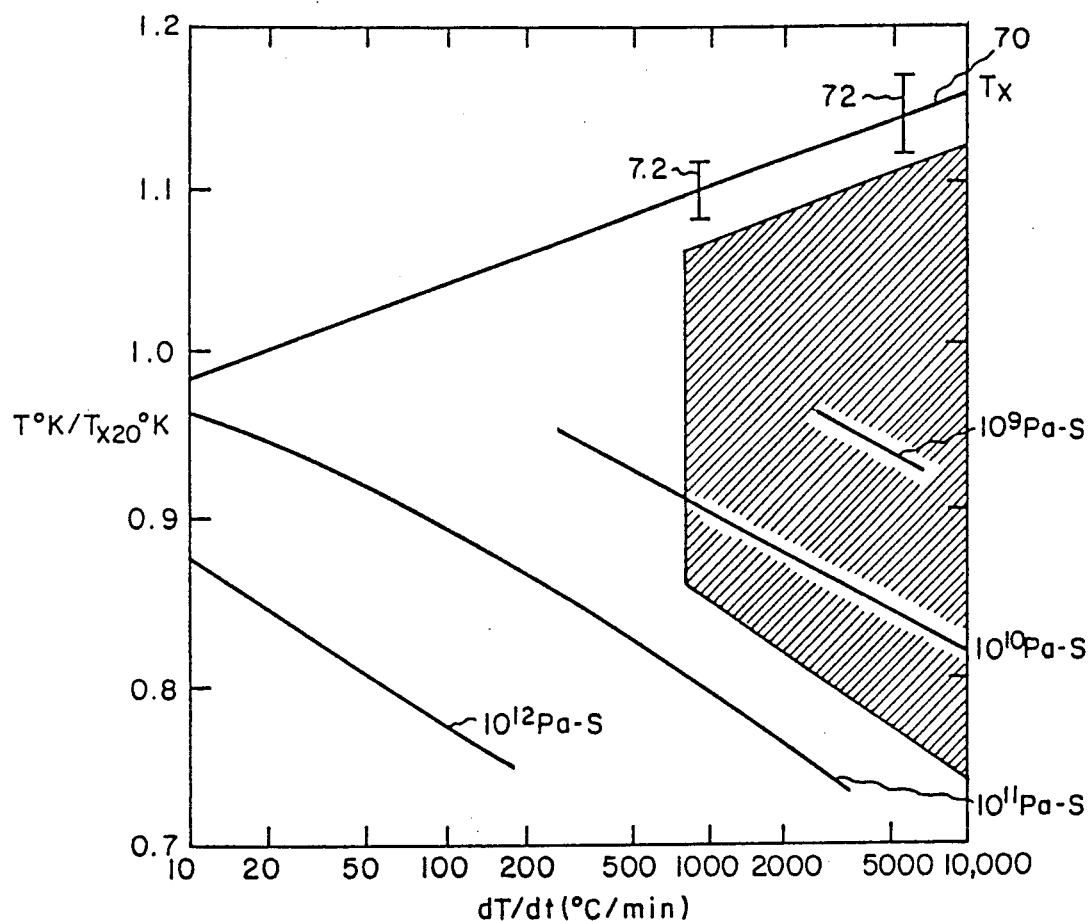
FIG. 2 illustrates the extended parameters of FIG. 1 for a situation where softening of the alloy can occur during the period of an isothermal hold.

In carrying out the method of severing a deck of amorphous alloy ribbons in accordance with the present invention, the severing operation must be performed above the softening temperature, but below the crystallization temperature of the alloy. A convenient way of expressing the temperatures in this critical range is to express the ratio of the temperature of an alloy sample in °Kelvin, to the temperature for the onset of crystallization. The ratio is $T°K./Tx°K.$ where $T°K.$ is the temperature of an amorphous alloy sample and $Tx°K.$ is the temperature at which the amorphous alloy begins to crystallize. In this way the softening temperatures can be normalized to describe all amorphous alloys. The normalized range of softening temperatures is illustrated in the graphs of FIGS. 1 and 2 as a function of the heating rate, or the rate at which temperature changes with time $dT/dt$ in °C./min. The temperature ratio $T°K./Tx°K.$ is represented by the ordinate, while the heating rate $dT/dt$ in °C./min is plotted as a logarithmic function along the abscissa. The upper line 60 and 70 in each of the graphs of FIGS. 1 and 2 represents the temperature for the onset of crystallization for the different heating rates designated along the abscissa. Approximate error bars 62 and 72 bracket the upper lines illustrating the variation in the temperature for the onset of crystallization due to the effects of compositional variations on crystallization behavior.

The graph of FIG. 2 further illustrates the advantages of rapidly heating to the softening temperature at rates of 1000° C./min. or greater. At these higher rates the difference between the softening temperature and the crystallization temperature becomes so large and the flow or viscosity so low that the alloy can be worked in the "soft" state during the period of an isothermal hold, or even during minor temperature drops, if the heating rate is high enough.

Therefore the softening temperature of an amorphous alloy is represented by the numerator of the temperature ratio, $T°K./Tx°K.$, on the ordinate of the graphs of FIGS. 1 and 2. Further the softening temperature lies within the range of temperatures corresponding to the hatched area of the graphs of FIGS. 1 and 2. In other words, the softening temperature is the numerator of the temperature ratio $T°K./Tx°K.$ on the ordinate of the graphs of FIGS. 1 and 2 corresponding to the hatched area of the graphs of FIGS. 1 and 2.

It should be understood, however, that softening can also occur at heating rates at and above 500° C./min., within the range of coordinates which lie within extensions of lines 60 and 68 of FIG. 1 and which rise to heating rates of 10,000° C./min. and higher. FIGS. 1 and 2 are taken from U.S. Pat. Nos. 4,584,036 and 4,715,906, both patents are assigned to the assignee of this invention and are incorporated by reference herein.

Figure 3:
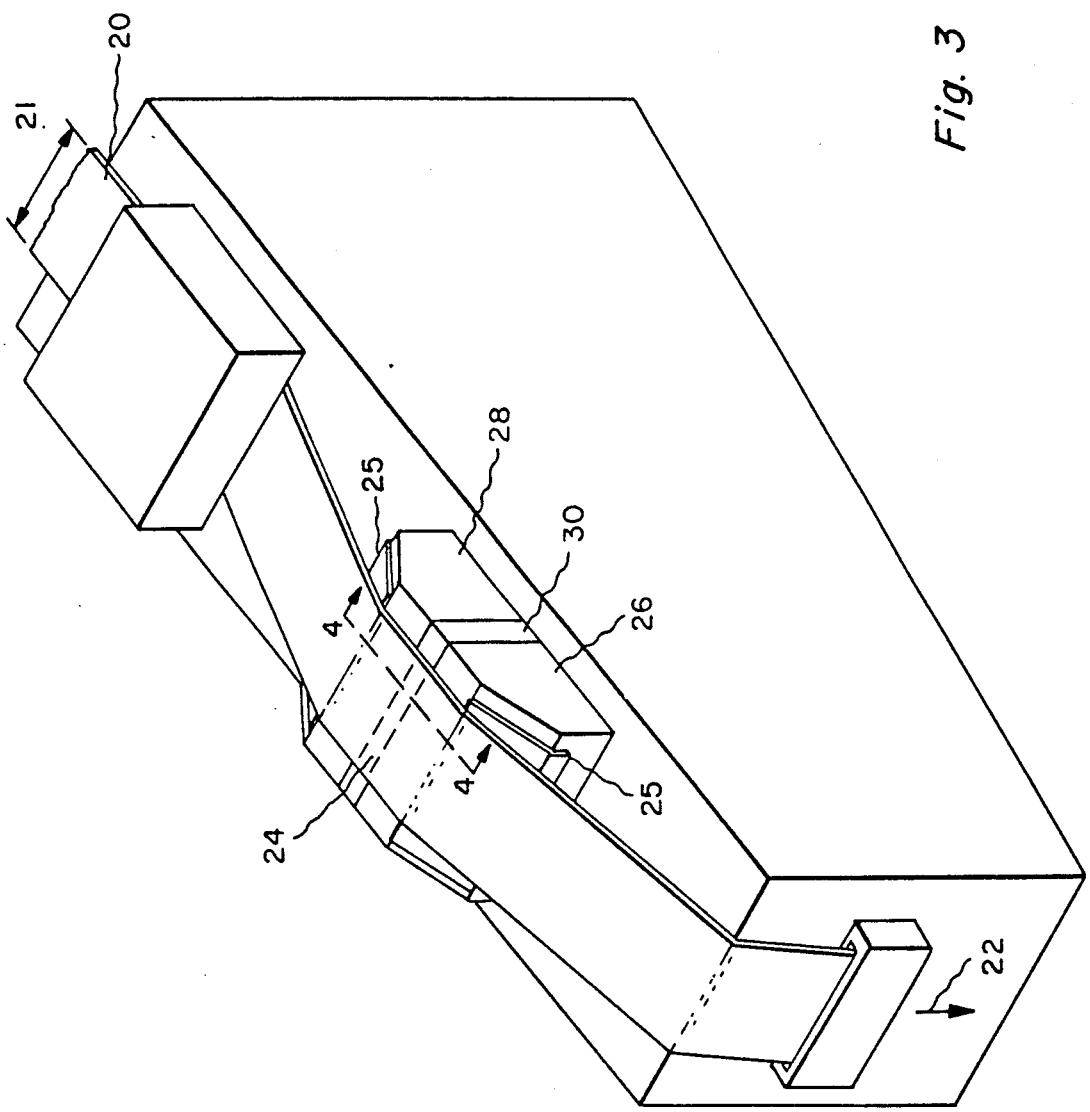
FIG. 3 is a schematic illustration of a deck of ribbons placed under tension according to one embodiment of the invention.

One method for carrying out the method of the present invention is schematically illustrated in FIG. 3. In this Figure a deck 20 was formed from at least two amorphous alloy ribbons. The deck may be provided in the form of a prebonded deck of ribbons in which the ribbons adhere to each other through their length. The deck was placed under tension by application of force 22 applied generally normal to an intended line of severance in the deck, referred to as the seam. Force 22 is of at least a magnitude that will cause separation at the seam when it is heated to the softening temperature of the amorphous alloy. It is expected the magnitude of the force may decrease as the heating rate is increased since increased heating rates can produce lower viscosities in the amorphous alloy.

A pair of electrodes 26 and 28 have tip surfaces contacting the deck. The rectangular electrode tip surfaces span at least the width of the deck and extend along the length of the deck a distance sufficient to make uniform electrical contact with the deck while providing a current of high density. A satisfactory length for the tip surface was found to be about 0.1 inch or less. Electrodes 26 and 28 were positioned to contact the same ribbon surface of the deck on opposite sides of zone 24. The direction of force 22 also urges the deck against electrodes 26 and 28 to compress the deck in a region encompassing the zone. Insulator 25 covers a portion of the electrode surfaces facing the deck excluding the tip surfaces. Preferably the electrodes are made from a metal of high thermal conductivity to help dissipate any heat diffusing from the zone.

Figure 4:
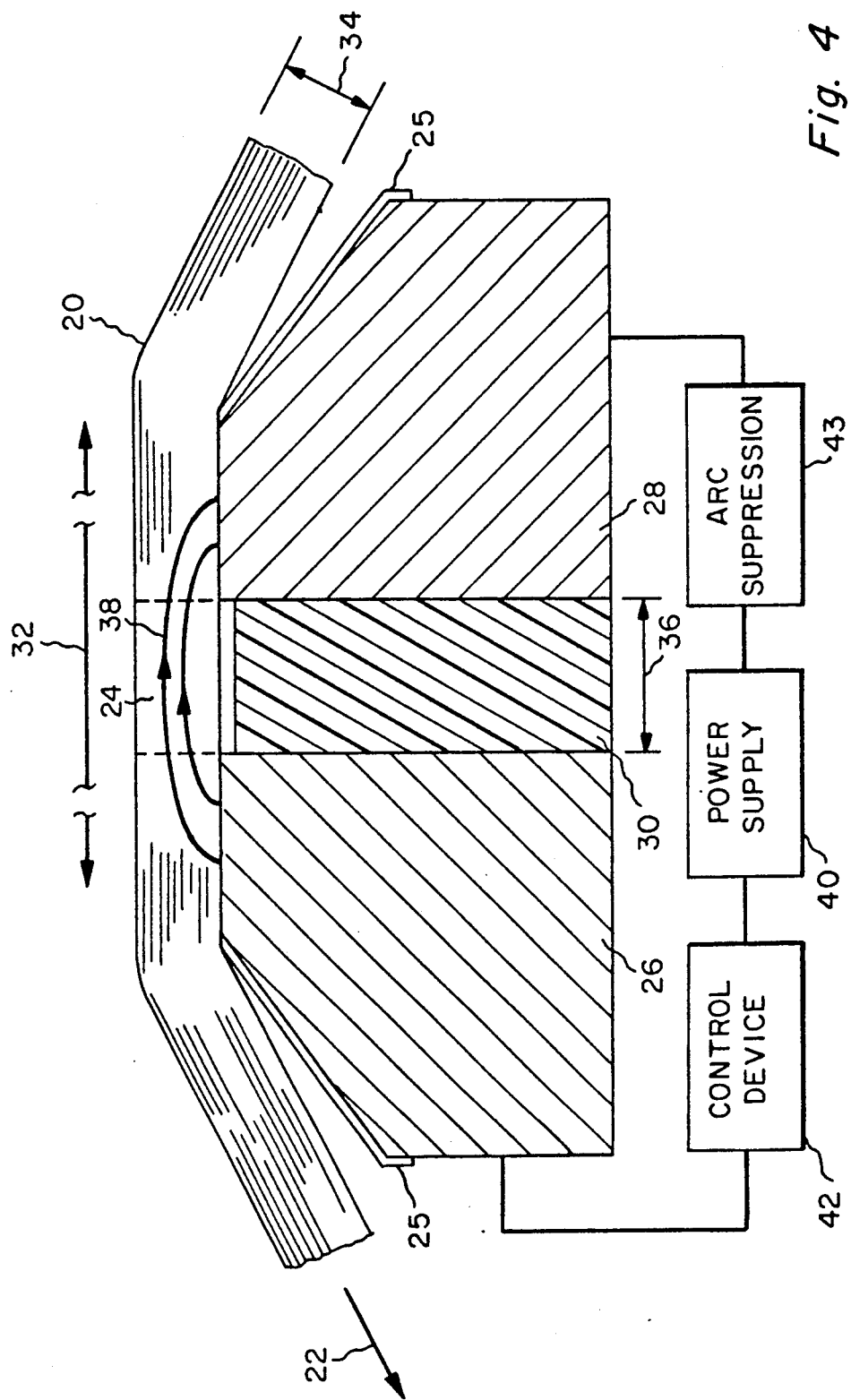
FIG. 4 is a cross sectional view of the apparatus of FIG. 3 taken along line 4—4.

For the sake of illustration, FIG. 4 depicts an enlarged cross section of FIG. 3 along line 4—4. As shown in FIG. 4, an insulating spacer 30 separates electrodes 26 and 28. The spacer not only inhibits arcing between the electrodes, but it also establishes a predetermined interelectrode spacing. The electrode spacing in turn limits the distance that a resistance heating current can flow along the length direction of the deck. This distance between electrodes is the length of zone 24.

The desired length of heated zone 24 is no more than about 0.01 inch. Preferably the zone length is about 0.002 to 0.005 inch. Limiting resistance heating to this narrow zone helps to minimize necking in the ribbon deck when separation occurs. Such a limited zone can be heated very rapidly so there is very little diffusion of heat from the zone.

After application of force 22 and compression of deck 20 in good electrical contact with electrodes 26 and 28, a power supply 40 applied a resistance heating current to the electrodes. A control device 42 was operatively connected to the power supply and electrodes. The control device was used to select the amplitude and duration of the heating current to heat the zone to within the range of softening temperatures of the amorphous alloy at a rate that allows separation to occur along the seam within a time period less than about one half of one second. Preferably, the time period is shortened to allow separation to occur with minimal necking.

Figure 5:
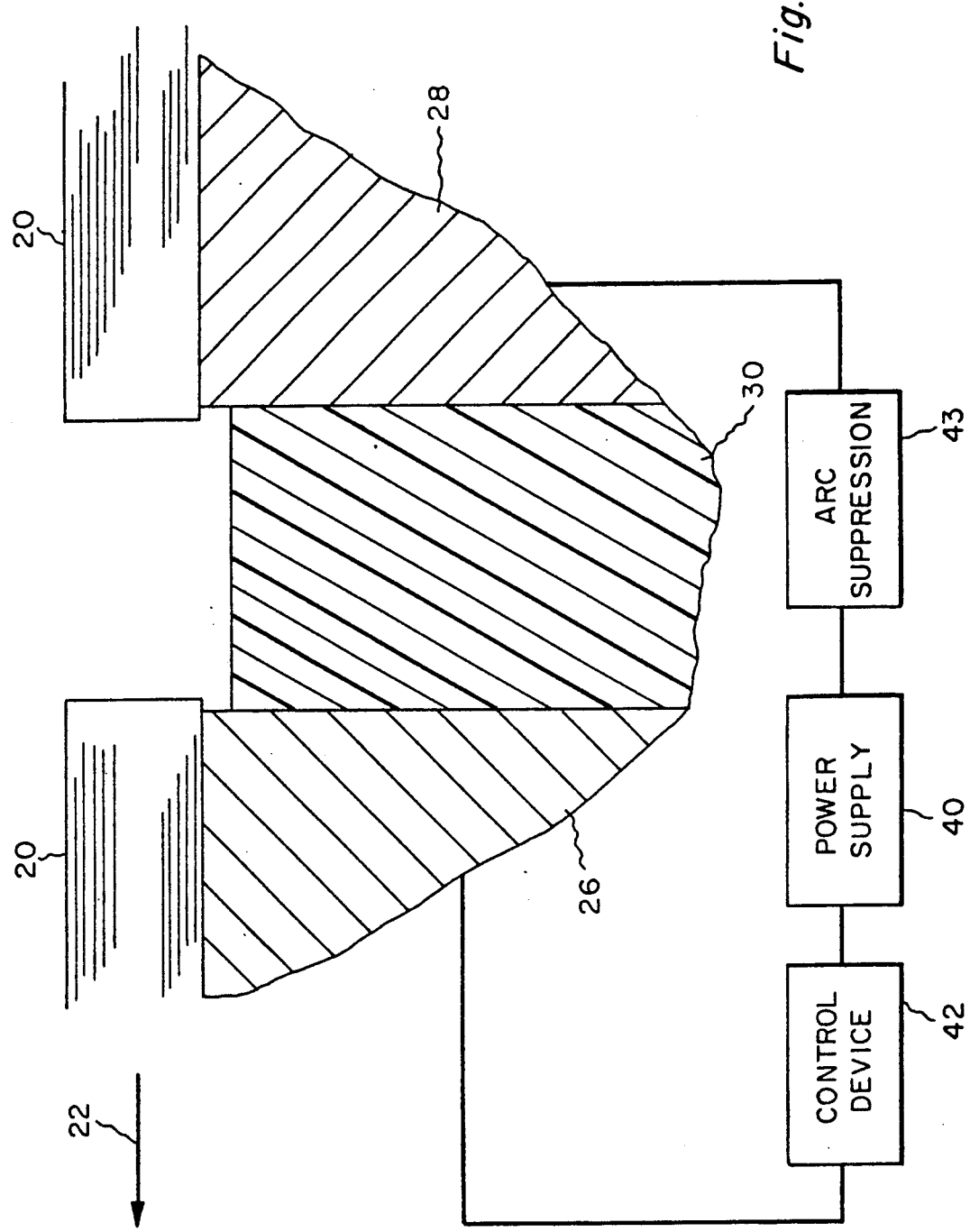
FIG. 5 illustrates a cross-sectional view of FIG. 4 after severance of the deck.

With reference now to FIG. 5, parting occurs quickly since the rapid rate of heating caused the viscosity of the amorphous alloy to drop to a very low flow resistance As a result, separation occurs through homogeneous deformation of the amorphous alloy thereby preserving its desirable magnetic properties. Because the deck bears the load of force 22 parting occurs about the time the range of softening temperatures of the amorphous alloy is reached. Current flow is stopped by separation so heating is stopped before the crystallization temperature of the amorphous alloy is reached. As shown in FIG. 5, the entire deck of ribbons was separated at the seam within the zone.

Referring back to FIG. 4, preferably a means to suppress arcing 43 is used to minimize any arcing between the separating deck edges. Arc suppression means such as those shown in U.S. Pat. No. 3,868,549 are suitable for preventing arcing in the method and apparatus of this invention. The teaching of U.S. Pat. No. 3,868,549 is incorporated herein to show a suitable means for suppressing the arc that occurs during ribbon separation. Arc suppression was found to be highly desirable since arcing caused melting and produced meltbeads at the cut edge.

Although decks of amorphous alloy ribbons were successfully parted using this first embodiment it was found a limited number of ribbons in a deck could be parted. As the number of ribbons in a deck increased, the magnitude of force 22 had to be increased to reduce interfacial resistance between ribbons. Eventually the magnitude of force 22 needed to reduce interfacial electrical resistance exceeds the strength of the ribbon deck causing it to break before application of the heating current.

Therefore to increase the number of ribbons in a deck to be separated a second embodiment of the present invention was developed. The compressive force that reduces interfacial resistance in the zone, was applied independently of the tensile force that places the deck in tension. Making reference to FIG. 6, electrodes 52 and 50 were placed on opposite ribbon surfaces of deck 20. Zone 24 is between the two electrodes along the length direction of the deck. The spacing or gap between electrodes 52 and 50 along the length direction of deck 20 was limited as in the prior embodiment This limits the desired length of resistance heated zone 24 to no more than about 0.01 inch. Preferably the zone length is about 0.002 to 0.005 inch.

Each electrode was formed from a square metal block. The electrode surface facing the deck had an electrical insulator 63 covering 90% of the square surface. A narrower rectangular surface 67 along one edge of each electrode contacted the deck adjacent zone 24. Insulator 63 was inserted into each electrode coplanar with electrode contact surface 67. A suitable electrode contact surface will at least span the width of the stack and extend along the length of the stack about 0.1 inch or less. Preferably, the electrodes are formed from a metal of high thermal conductivity to dissipate any heat that may diffuse from the zone.

A pair of pressure pads 54 and 56 were aligned opposite electrodes 50 and 52 respectively. Each pressure pad presents a surface facing the deck of a similar size as the electrode surface facing the deck. The pressure pads may optionally be covered by an electrical insulator 65 on the surface facing the deck. The deck was compressed between the electrodes and pressure pads, sometimes hereafter referred to as the components, to reduce the interfacial electrical resistance between ribbons in a region encompassing zone 24. This was accomplished by applying a force 61 to each of the oppositely aligned components in a direction to compress the deck between them. Another method would be to fix the components facing one ribbon surface so they are stationary and apply force 61 to the components facing the opposite ribbon surface in a direction to compress the deck there between. Any arrangement of stationary or moving components that compresses the deck throughout the region encompassing zone 24 is acceptable.

The deck was placed under tension by force 58 in a direction generally normal to the seam. Force 58 is of at least a magnitude that will separate the deck when it is heated to the softening temperature of the amorphous alloy. Successful separation has been achieved with a force having a magnitude of at least about 50 pounds per inch of ribbon width, per number of ribbons in the deck for a heating current of about 600 amps. However, it is expected the magnitude of the force may decrease as the amperage of the heating current and the resultant heating rate increases.

A power supply 67 was operatively connected to a control device 69 and the electrodes. The control device was used to select the duration and amplitude of the resistance heating current from the power supply, to heat the zone to the range of softening temperatures at a rate that will allow separation to occur within a time period less than about one half of one second. Preferably the time period is shortened to allow separation to occur with minimal necking. As in the first embodiment, separation occurs along a nascent seam within the zone while it is under tension and during heating. An arc suppression means 43 may be employed as in the first embodiment to minimize arcing between the separating deck edges.

With this second embodiment when heating rates corresponding to the hatched area of FIG. 2 or extensions thereof to heating rates of 10,000° C./min or greater are used, there is a period between one and several seconds where the amorphous alloy remains in its "soft" state. This means it would be possible to apply separating force 58 after heating has occurred to separate the deck at the seam while the amorphous alloy is in its softened state.

Figure 6:
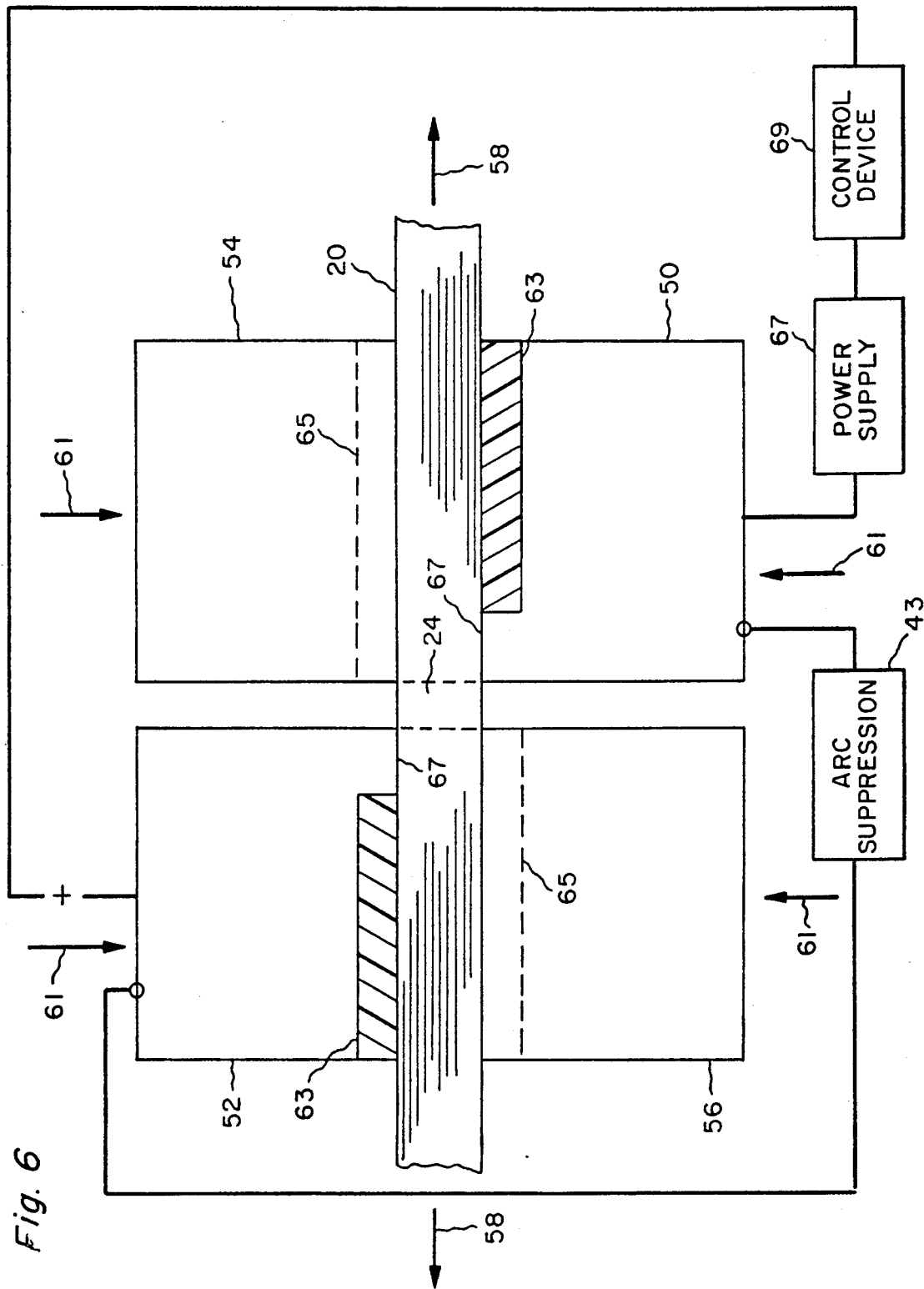
FIG. 6 is a cross sectional view of a second embodiment of the present invention.

Therefore, a third embodiment having generally the same components as the second embodiment can be described by making reference to FIG. 6. The third embodiment additionally has a means for applying force 58 to deck 20 within one to several seconds after heating zone 24 while the amorphous alloy is still in its "soft" state. Such means may include a punch press capable of exerting high load forces very quickly. Control device 69 selects the duration and amplitude of the resistance heating current from the power supply, to heat the zone to the range of softening temperatures at a rate that will allow separation to occur upon the application of a predetermined tensile force after the heating current is stopped. The duration of heating current is for a time period less than about one half of one second. When the period of current flow is completed the means for applying the separating force immediately applies force 58 so that separation occurs during the period of the isothermal hold where the amorphous alloy remains in its "soft" state. Preferably, the time period of current application is shortened to minimize necking at the seam. An inherent advantage of this third embodiment is that no arc forms between the separating deck edges. No arc can form because current flow is stopped before separation of the deck edges begins.

Figure 7:
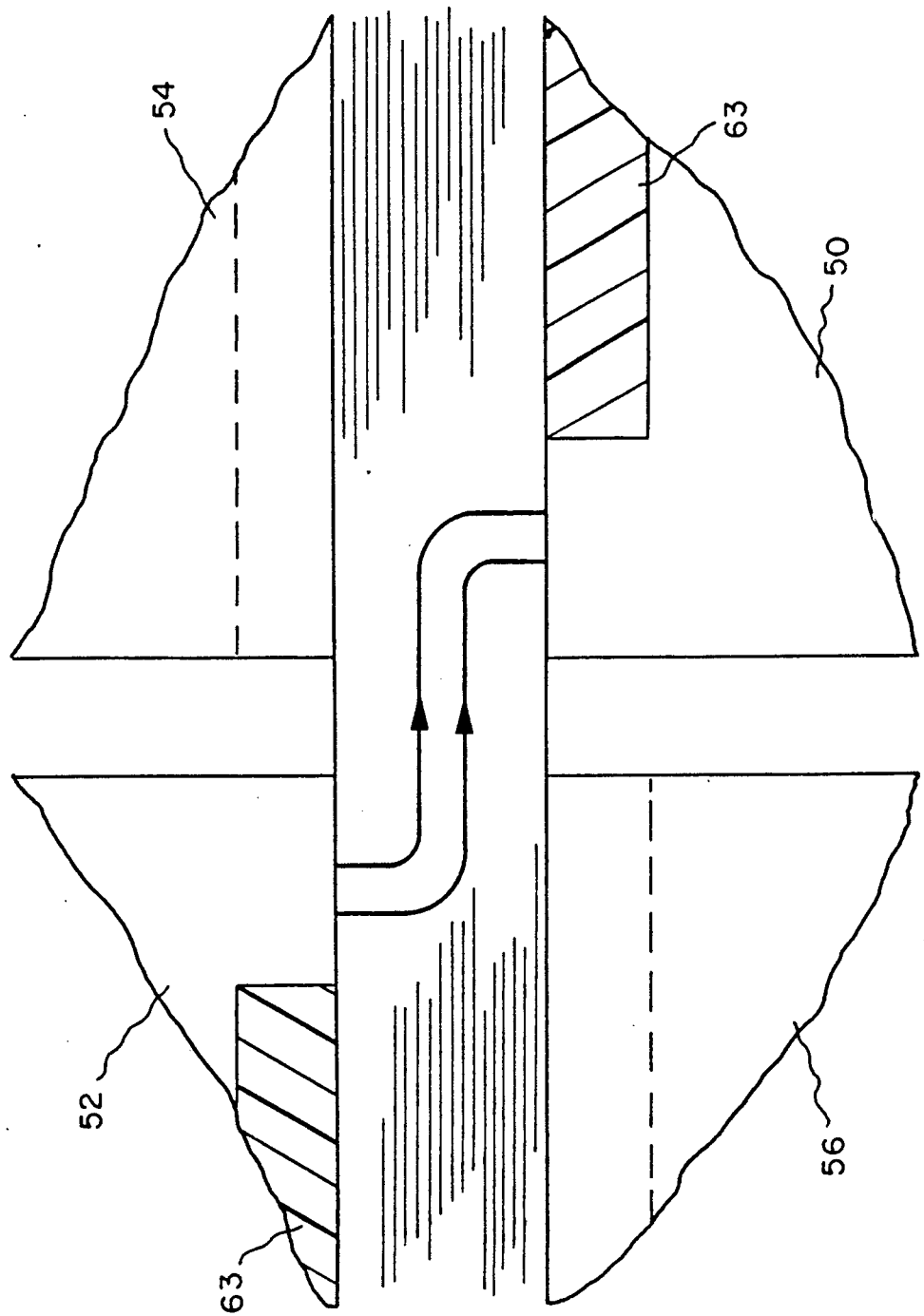
FIG. 7 is an enlarged view of the apparatus of FIG. 6 illustrating the current path in the deck of ribbons.

Referring now to FIG. 7, placement of the electrodes according to the second and third embodiments forces the current to flow in a more efficient manner through the thickness of the deck and along a limited distance of the length of the deck. This allows the current path to be controlled more precisely and predictably. As a result, it was found separation occurred more rapidly for a given current and force and the severed edge quality improved. Separated edges could be produced without meltbeads or burrs and were substantially free of any cracking or chipping.

In the second embodiment, the severed deck edge was also characterized by surface welds formed between ribbons at the severed edge of the separated decks. This results from heating the ribbons to their softening temperature under the influence of a separate compressive force. Therefore, instead of having a deck of loose ribbons, a deck bonded at the severed edge was formed. This is considered to be very beneficial in the manufacturing environment. Handling and stacking of the ribbon decks is greatly facilitated by such bonding.

Figure 8:
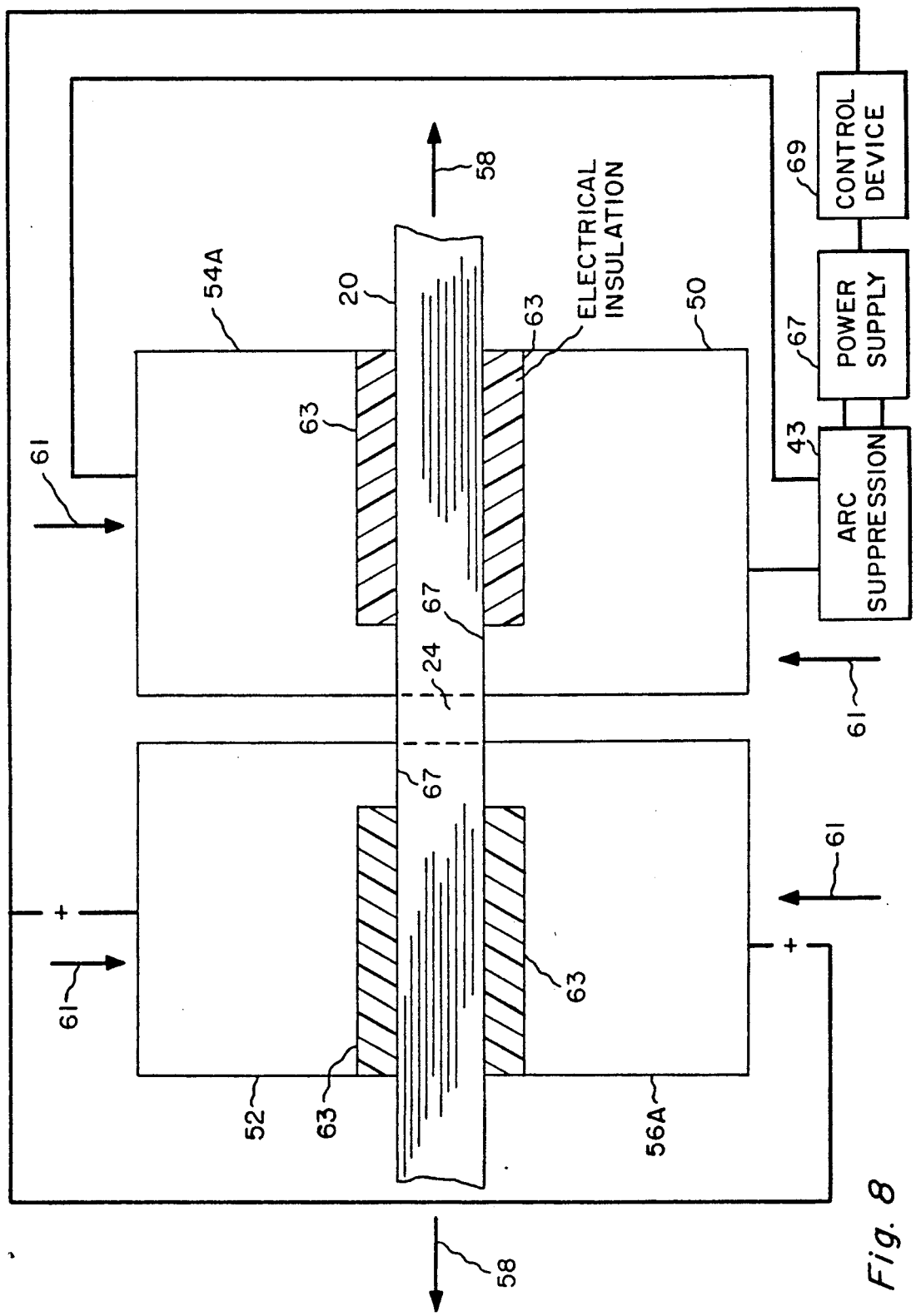
FIG. 8 is a cross-sectional view of a fourth embodiment of the present invention.

FIG. 8 depicts a fourth embodiment where electrodes 54A and 56A replaced pressure pads 54 and 56 shown in FIG. 6 as part of the second embodiment. The fourth embodiment operates in the same manner as the second embodiment with the following modifications. The deck was compressed by applying force 61 to each of the oppositely aligned electrodes. Power supply 67 and control device 69 were operatively connected to the four electrodes as shown in FIG. 8 so that when current is applied to electrodes 52 and 56A it flows through zone 24 to electrodes 50 and 54A.

The following examples are offered to further illustrate the present invention when practiced in accordance with the method of the second and fourth embodiments.

EXAMPLE I

A deck containing ribbons of an amorphous metal was loaded by clamping one end so it was stationary and fixing a dead weight on the other end of the deck with a fulcrum advantage of 5:1. By changing the dead weight a tensile force ranging from 150 to 500 pounds was produced for pulling the deck in its length direction. The electrode configuration of the second embodiment was fixed on the deck by bolting the oppositely positioned components together. The amount of torque that was used to tighten the bolts determined the magnitude of the compressive force placed on the deck to reduce interfacial electrical resistance between ribbons. The gap between electrodes in the length direction of the deck was controlled by inserting an insulating spacer between the two electrode and pressure pad sets. The gap was changed by inserting insulating spacers of different thickness to produce gaps from 0.002 to 0.015 inch. Power was supplied to the electrodes by a cycle controlled AC power supply operatively connected to the electrodes. This AC power source supplied currents ranging from 601 to 642 amps. Ribbon decks containing one to two inch wide ribbons with from 3 up to 10 ribbons were subjected to this method of separation while varying the electrode gap, deck tensioning force, and heating current amperage. A characterization of the separated edge quality is shown in Table I below for different combinations of electrode gap, tensile force and heating current amperage

EXAMPLE II

Ribbon decks containing four amorphous alloy ribbons 0.5 or 2 inches wide were subjected to the same separating method as explained in Example I, except the four electrode configuration of the fourth embodiment was used to apply the heating current. A lower capacity power supply was used in five of the eight tests producing a current ranging from 235 to 273 amps. Three other tests were performed using the same power supply used in Example I. The tensile force was varied from 25 up to 400 pounds, while the electrode gap was varied from 0.010 to 0.020 inch. A characterization of the separated edge quality for different combinations of gap, force and amperage is reported in Table II below.

TABLE I

PARTING CHARACTERISTICS USING OPPOSED ELECTRODES ACCORDING TO SECOND EMBODIMENT

| Test Number | Ribbon Width (inch) | Number of Ribbons | Electrode Spacing (inch) | Force (lbs) | CURRENT APPLICATION TIME | | Cut Quality |
|---|---|---|---|---|---|---|---|
| | | | | | I (amps) | milli-seconds | |
| 1 | 1.0 | 6 | .005 | 300 | 606 | 68 | Type 2 |
| 2 | " | " | .002 | 300 | 624 | 123 | Type 1 |
| 3 | " | " | .002 | 150 | 636 | 218 | Type 2 |
| 4 | " | " | .002 | 300 | 634 | * | Type 1 |
| 5 | " | " | .002 | 300 | 601 | 80 | Type 1 |
| 6 | " | 9 | .002 | 450 | 617 | 318 | Type 3 |
| 7 | " | 10 | .002 | 500 | 634 | 650+ | No Part |
| 8 | 2.0 | 3 | .015 | 300 | 637 | 281 | Type 2 |
| 9 | " | " | .010 | 300 | * | * | Type 2 |
| 10 | " | " | .005 | 300 | 642 | 166 | Type 1 |

*no data

In the comments under cut quality, "Type 1" means a severed edge with no substantial cracking or chipping which is suitable for use in manufacturing magnetic cores. "Type 2" means moderate cracking or chipping of the severed edge although such edges are still acceptable for less demanding applications. Type 3 means a badly cracked and chipped edge that is generally considered unacceptable for most applications. "No part" means the deck did not separate. Decks exhibiting Type 1 cut edges also exhibited the bonded severed edges produced by the method of the second embodiment of this invention described previously. FIG. 8 is a photograph of a Type 1 severed edge from one of the ribbons in test no. 2. This can be compared to the photograph in FIG. 9 of a Type 2 severed edge from test no. 1. The arrow in FIGS. 9 and 10 points to the edge formed by separation.

The results from Example I in Table I show that a deck of amorphous alloy ribbons can be separated successfully by the method of this invention. This occurs when the three variables in this method, tensile force (pounds), heating current (amps), and electrode spacing (inch) are properly controlled to cause separation. These variables are adjusted for changes in the two deck parameters of ribbon width and number of ribbons in the deck. The quality of the severed edge can be improved to where the severed edge is substantially free of any cracking or chipping with proper control of these variables as shown by the four Type 1 edges produced in Example I.

When the number of ribbons in the deck increases, it was found the electrode spacing must be lowered to restrict the resistance heated zone. This is shown by comparing test numbers 1, 2, 4, 5, and 10. The three ribbons in the deck of test 10 were doubled to six ribbons in the deck of test 1. Electrode spacing, force, and current amperage remained similar. The increased number of ribbons in test 1 caused the cut quality to deteriorate from the Type 1 edge in the three ribbon deck of test 10 to a Type 2 edge in the six ribbon deck of test 1. However, when the electrode spacing for the six ribbon decks of tests 2, 4 and 5 were reduced to 0.002 as compared to the 0.005 inch spacing in tests 1 and 10, cut quality improved to the Type 1 edge of test 10. Therefore by reducing the size of the gap when the number of ribbons in the deck was increased as in tests 2, 4 and 5, cut quality was improved.

For the magnitude of force and current amperage used in tests 1 through 10 separation was achieved with an inter-electrode spacing of up to 0.015 inch, more satisfactory severed edges were made with a 0.010 inch spacing, while the best cuts were at a 0.002 to 0.005 inch spacing.

When the tensile force was lowered but similar heating currents were used, poorer cuts were observed in the tests that used the lower tensile force. This is expected since separation occurs at a higher temperature and requires a longer heating time for the same current amperage. Since the heating time increases thermal diffusion is greater and the cut quality deteriorates. For example, compare test number 2 and 3. Test 3 was performed with half the tensile force of test 2 while electrode spacing, current amperage, ribbon width, and number of ribbons in the deck remained similar. Test 3 produced a Type 2 edge while test 2 produced a Type 1 edge. The reduced tensile force in test 3 caused the time required to sever to increase from 123 milliseconds in test 2 to 218 milliseconds in test 3. As a result, diffusion heating increased and the cut edge quality suffered. It is believed the tensile force can be decreased if the heating current amperage is increased.

The poorest results were given by tests 6 and 7 having nine and ten ribbon decks respectively as compared to the three and six ribbon decks in other tests. It is apparent current amperage must be increased to compensate for the greater number of ribbons in these decks. Therefore, a higher capacity power supply is needed to overcome the additional resistance from the additional ribbons in the decks of tests 6 and 7.

Tests 2, 4, and 5 show that a high quality severed edge substantially free of cracking or chipping can be produced repeatedly by the method of this invention. Tests 2, 4, and 5 were conducted on ribbon decks having the same parameters while the method variables of electrode spacing, tensile force, and heating current amperage were also similar.

Additional data is provided below in Table II from Example II where the heating current was applied using the four electrode arrangement of the fourth embodiment.

TABLE II

PARTING CHARACTERISTICS USING FOUR ELECTRODES ACCORDING TO FOURTH EMBODIMENT

| Test Number | Ribbon Width (inch) | Number of Ribbons | Electrode Spacing (inch) | Force (lbs) | I (amps) | milli-seconds | Cut Quality |
|---|---|---|---|---|---|---|---|
| 11 | 0.5 | 4 | .020 | 50 | 248 | 66 | Type 3 |
| 12 | " | " | .010 | 25 | 273 | 92 | Type 3 |
| 13 | " | " | " | 50 | 235 | 117 | Type 3 |
| 14 | " | " | " | 50 | 250 | 79 | Type 3 |
| 15 | " | " | " | 100 | 253 | 66 | Type 2 |
| 16 | 2.0 | 4 | .010 | 200 | 632 | 650+ | No Part |
| 17 | " | " | " | 300 | 641 | 512 | Type 2 |
| 18 | " | " | " | 400 | 629 | 309 | Type 2 |

(CURRENT APPLICATION TIME spans the I (amps) and milli-seconds columns)

Tests 11-15 in Table II from Example II were performed using much lower heating current amperage and tensile force as compared to the tests in Table I from Example I. Although the decks were separated the lower quality Type 3 and Type 2 edges were produced. The ribbon width, tensile force, and heating current amperage were increased in tests 16–18. Test 16 did not separate because the tensile force was too low. Tests 17 and 18 were performed with an increased tensile force over test 16 and tests 17 and 18 did separate to produce Type 2 edges.

Although deck separation was achieved in Example II using the four electrode configuration of the fourth embodiment, it is believed the two electrode configuration of the second and third embodiments and used in Example I produces the highest quality severed edge. Similarly, the second and third embodiments are expected to produce a higher quality severed edge than the first embodiment. This is due to the more efficient current path used in the second and third embodiments. It offers a more controlled and constricted current path to restrict heating along the length of the deck while uniformly heating through the thickness. This produces a higher quality severed edge more consistently and in decks having a greater number of ribbons.

While the invention has been particularly shown and described with reference to several embodiments thereof, it will be understood by those skilled in the art that various changes in form and detail may be made therein without departing from the spirit and scope of the invention.

What is claimed is:

1. A method for severing a deck of amorphous alloy ribbons along an intended seam, said seam being located within a predetermined zone that traverses said deck in its width and height dimensions; said method comprising:
   placing said deck under tension by the application of a tensile force of predetermined direction and magnitude;
   placing said deck under compression along said height dimension throughout a region of said deck encompassing said zone to reduce interfacial electrical resistance between said ribbons in said region;
   applying a heating current to pass through the deck in said zone to resistance heat said zone while said deck is under said tension and compression; and
   controlling the duration and amplitude of said current to heat said zone to a temperature within the range of softening temperatures of said amorphous alloy at a predetermined rate, said heating rate being selected to allow separation of said deck to occur along said seam within a time period less than about one half of one second upon the application of said tensile force.

2. A method in accordance with claim 1 wherein the selection of said heating rate reduces said time period to a point where necking at said seam is minimized when said separation occurs.

3. A method in accordance with claim 1 wherein said heating current is applied through a pair of electrodes; said step of placing said deck under compression comprising:
positioning said pair of electrodes facing opposite ribbon surfaces of said deck in said region on opposite sides of said zone;
positioning a pressure pad opposite each of said electrodes such that said deck is located between each pair of oppositely positioned components; and
applying a compressive force to said deck through said oppositely positioned components; whereby the combined effect of said deck compression and said resistance heating causes the ribbon edges formed along said seam upon separation to adhere to each other in each separated portion of said deck.

4. A method in accordance with claim 1 wherein said heating current is applied through a pair of electrodes; said step of placing said deck under compression comprising:
positioning said pair of electrodes in contact with the same ribbon surface of said deck in said region on opposite sides of said zone; and
urging said deck against said electrodes by the selection of the direction in which said tensile force is applied.

5. A method in accordance with claim 1 wherein said heating current is applied through two pairs of electrodes; said step of placing said deck under compression comprising:
positioning a first and a second pair of electrodes facing opposite ribbon surfaces of said deck in said region so that said first and second pair of electrodes are on opposite sides of said zone; and
applying a compressive force to said deck through said first and second pair of electrodes.

6. A method in accordance with claim 1 wherein said zone extends no more than about 0.01 inch in the length direction of said deck.

7. A method in accordance with claim 1 wherein said zone is about 0.002 to 0.005 inch in the length direction of said deck.

8. A method in accordance with claim 1 wherein the magnitude of said tensile force applied to said deck is at least about 50 pounds per inch of ribbon width per number of ribbons in said deck.

9. A method in accordance with claim 1 further comprising the step of diverting said heating current from said seam during separation to suppress arcing between the separating deck edges.

10. A method for severing a deck of amorphous alloy ribbons along an intended seam, said seam being located within a predetermined zone that traverses said deck in its width and height dimensions; said method comprising the steps of:
placing said deck under compression along said height dimension throughout a region of said deck encompassing said zone to reduce interfacial electrical resistance between said ribbons in said region;
applying a heating current to pass through the deck in said zone to resistance heat said zone while said deck is under said tension and compression;
controlling the duration and amplitude of said current to heat said zone to a temperature within the range of softening temperatures of said amorphous alloy at a predetermined rate, said heating rate being selected to allow separation of said deck to occur along said seam within a time period less than about one half of one second upon the application of a tensile force of predetermined direction and magnitude;
stopping said current when said temperature is reached; and
placing said deck under tension by the application of said tensile force while said zone is within said range of softening temperatures to separate said deck along said seam.

11. A method in accordance with claim 10 wherein the selection of said heating rate reduces said time period to a point where necking at said seam is minimized when said separation occurs.

12. A method in accordance with claim 10 wherein said heating current is applied through a pair of electrodes; said step of placing said deck under compression comprising:
positioning said pair of electrodes facing opposite ribbon surfaces of said deck on opposite sides of said zone;
positioning a pressure pad opposite each of said electrodes such that said deck is located between each pair of oppositely positioned components; and
applying a compressive force to said deck through said oppositely positioned components.

13. A method in accordance with claim 10 wherein said heating current is applied through two pairs of electrodes, said step of placing said deck under compression comprising:
positioning a first and a second pair of electrodes facing opposite ribbon surfaces of said deck in said region, so that said first and second pair of electrodes are on opposite sides of said zone; and
applying a compressive force to said deck through said first and second pair of electrodes.

14. A method in accordance with claim 10 wherein said zone extends no more than about 0.01 inch in the length direction of said deck.

15. A method in accordance with claim 10 wherein said zone is about 0.002 and 0.005 inch in the length direction of said deck.

* * * * *